United States Patent
Ebrahimi et al.

(10) Patent No.: US 12,220,818 B2
(45) Date of Patent: Feb. 11, 2025

(54) SINGULARITY-FREE KINEMATIC PARAMETERIZATION OF SOFT ROBOT MANIPULATORS

(71) Applicant: AUTODESK, INC., San Francisco, CA (US)

(72) Inventors: Mehran Ebrahimi, Toronto (CA); Hyunmin Cheong, Toronto (CA); Adrian Butscher, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 299 days.

(21) Appl. No.: 17/319,502

(22) Filed: May 13, 2021

(65) Prior Publication Data

US 2022/0105627 A1    Apr. 7, 2022

Related U.S. Application Data

(60) Provisional application No. 63/087,839, filed on Oct. 5, 2020.

(51) Int. Cl.
| | |
|---|---|
| *B25J 9/16* | (2006.01) |
| *B25J 18/00* | (2006.01) |
| *B25J 18/06* | (2006.01) |

(52) U.S. Cl.
CPC .......... *B25J 9/1635* (2013.01); *B25J 9/1607* (2013.01); *B25J 9/163* (2013.01); *B25J 9/1633* (2013.01); *B25J 9/1653* (2013.01); *B25J 9/1666* (2013.01)

(58) Field of Classification Search
CPC ........ B25J 9/1635; B25J 9/1607; B25J 9/163; B25J 9/1633; B25J 9/1653; B25J 9/1666;
(Continued)

(56) References Cited

U.S. PATENT DOCUMENTS

| | | | | |
|---|---|---|---|---|
| 2002/0173878 | A1* | 11/2002 | Watanabe | B25J 9/1638 |
| | | | | 700/247 |
| 2014/0277741 | A1* | 9/2014 | Kwon | A61B 34/37 |
| | | | | 700/263 |

(Continued)

FOREIGN PATENT DOCUMENTS

| | | |
|---|---|---|
| CN | 109015655 A | 12/2018 |
| CN | 110587589 A | 12/2019 |

(Continued)

OTHER PUBLICATIONS

Ouyang et al., "Design of an Interactive Control System for a Multisection Continuum Robot," Published Jul. 12, 2018, IEEE/ASME Transactions on Mechatronics, vol. 23, Issue 5, pp. 2379-2389 (Year: 2018).*

(Continued)

*Primary Examiner* — Adam R Mott
*Assistant Examiner* — Byron Xavier Kasper
(74) *Attorney, Agent, or Firm* — Artegis Law Group, LLP (57) ABSTRACT

A computer-implemented method for controlling a robot, the method comprising: determining a first value for a first joint parameter associated with a first continuum joint included in the robot and a first value for a second joint parameter associated with the first continuum joint, wherein the first joint parameter indicates a bending radius of a flexible portion of the continuum joint, and the second joint parameter indicates a rotation of the flexible portion of the continuum joint with respect to a base portion of the first continuum joint; and positioning an end portion of the robot at a final target location based on the first value of the first joint parameter and the first value of the second joint parameter.

19 Claims, 5 Drawing Sheets

(58) Field of Classification Search
CPC ........ B25J 9/1615; B25J 18/06; B25J 9/1679; B25J 9/1664; B25J 18/00; B25J 9/065; B25J 9/06; B25J 1/02

See application file for complete search history.

(56) References Cited

U.S. PATENT DOCUMENTS

| | | | | |
|---|---|---|---|---|
| 2016/0016319 | A1* | 1/2016 | Remirez | A61B 34/71 |
| | | | | 74/490.04 |
| 2018/0243900 | A1* | 8/2018 | Tanaka | B25J 9/065 |
| 2018/0338796 | A1* | 11/2018 | Yao | E21B 44/02 |
| 2019/0015978 | A1* | 1/2019 | Takagi | B25J 9/065 |
| 2020/0230808 | A1 | 7/2020 | Simaan et al. | |
| 2021/0369081 | A1* | 12/2021 | Kose | A61B 34/30 |

FOREIGN PATENT DOCUMENTS

| | | | | |
|---|---|---|---|---|
| JP | 2014-180751 | A | 9/2014 | |
| JP | 2019-166307 | A | 10/2019 | |
| KR | 20150084552 | A * | 7/2015 | ............ A61B 34/37 |
| WO | WO-2016198844 | A1 * | 12/2016 | ............ A61B 17/17 |
| WO | WO-2020173816 | A1 * | 9/2020 | ............ A61B 34/20 |

OTHER PUBLICATIONS

Kolpashchikov et al., "FABRIK-Based Inverse Kinematics for Multi-Section Continuum Robots," Jan. 24, 2019 (Year: 2019).*

Wilkening et al., "Development and Experimental Evaluation of Concurrent Control of a Robotic Arm and Continuum manipulator for Osteolytic Lesion Treatment," Published Mar. 6, 2017, IEEE Robotics and Automation Letters, vol. 2, Issue 3, pp. 1625-1631 (Year: 2017).*

Chen et al., "Modular Continuum Robotic Endoscope Design and Path Planning," 2014 (Year: 2014).*

Gonthina et al., "Mechanics for Tendon Actuated Multisection Continuum Arms," 2020 (Year: 2020).*

He et al., "An Analytic Method for the Kinematics and Dynamics of a Multiple-Backbone Continuum Robot," Oct. 3, 2012 (Year: 2012).*

Cheong et al., "Optimal Design of Continuum Robots With Reachability Constraints", IEEE Robotics and Automation Letters, Doi: 10.1109/LRA.2021.3066978, vol. 6, No. 2, Apr. 2021, pp. 3902-3909_.

WEBSTER III et al., "Design and Kinematic Modeling of Constant Curvature Continuum Robots: A Review", The International Journal of Robotics Research, DOI: 10.1177/0278364910368147, vol. 29, No. 13, Jun. 10, 2010, pp. 1661-1683.

Iannan et al., "Kinematics and the Implementation of an Elephant's Trunk Manipulator and Other Continuum Style Robots Journal of Robotic Systems", DOI: 10.002/rob. 10070, vol. 20, No. 2, 2003, pp. 45-63.

Jones et al., "Kinematics for Multisection Continuum Robots", IEEE Transactions on Robotics, DOI 10.1109/ TRO.2005.861458, vol. 22, No. 1, Feb. 2006, pp. 43-55.

Neppalli et al., "Design, Construction, and Analysis of a Continuum Robot", 2007 IEEE/RSJ International Conference on Intelligent Robots and Systems, IEEE, October 29-Nov. 2, 2007, pp. 1503-1507.

Kapadia et al., "Self-Motion Analysis of Extensible Continuum Manipulators", 2013 IEEE International Conference on Robotics and Automation. IEEE, May 6-10, 2013, pp. 1988-1994.

Garriga-Casanovas et al., "Kinematics of Continuum Robots With Constant Curvature Bending and Extension Capabilities", Journal of Mechanisms and Robotics, vol. 11, No. 1, Feb. 2019, p. 011010-1:011010-12.

Allen et al., "Closed-Form Non-Singular Constant-Curvature Continuum Manipulator Kinematics", 2020 3rd IEEE International Conference on Soft Robotics (RoboSoft), IEEE, 2020, pp. 410-416.

Larranaga, P., "A Review on Estimation of Distribution Algorithms", Estimation of Distribution Algorithms, Chapter 3, Springer, 2002, pp. 57-100.

Arranaga et al., "Optimization in continuous domains by learning and simulation of gaussian networks", Genetic and Evolutionary Computation Conference (GECCO), 2000, 4 pages.

Extended European Search Report for Application No. 21199628.5 dated Feb. 25, 2022, 11 pages.

Ouyang et al., "Design of an Interactive Control System for a Multisection Continuum Robot", IEEE/ASME Transactions on Mechatronics, vol. 23, No. 5, Oct. 1, 2018, pp. 2379-2389.

Bodily, Daniel Mark, "Design Optimization and Motion Planning for Pneumatically-Actuated Manipulators", URL: https://scholarsarchive.byu.edu/cgi/viewcontent.cgi?article=7289&context=etd, Apr. 1, 2017, 80 pages.

Li et al., "Design and Control of a tendon-driven Continuum Robot", Transactions of the Institute of Measurement and Control, DOI: 10. 1177/0142331216685607, vol. 40, No. 11, Jul. 1, 2018, pp. 3263-3272.

Zhao et al., "Continuum Manipulator with Redundant Backbones and Constrained Bending Curvature for Continuously Variable Stiffness", IEEE/RSJ International Conference on Intelligent Robots and Systems, DOI: 10.1109/IROS.2018.8593437, Oct. 1-5, 2018, pp. 7492-7499.

Zhao et al., "A Continuum Manipulator with Closed-form Inverse Kinematics and Independently Tunable Stiffness", IEEE International Conference on Robotics and Automation, Doi: 10.1109/ICRA40945.2020.9196688, May 31-Aug. 31, 2020, pp. 1847-1853.

* cited by examiner

SINGULARITY-FREE KINEMATIC PARAMETERIZATION OF SOFT ROBOT MANIPULATORS

CROSS-REFERENCE TO RELATED APPLICATIONS

This application claims priority benefit of the United States Provisional Patent Application titled, "SINGULARITY-FREE KINEMATIC PARAMETERIZATION OF SOFT ROBOT MANIPULATORS," filed on Oct. 5, 2020 and having Ser. No. 63/087,839. The subject matter of this related application is hereby incorporated herein by reference.

BACKGROUND

Field of the Various Embodiments

The various embodiments relate generally to computer science and robotics, and, more specifically, to singularity-free kinematic parameterization of soft robot manipulators.

DESCRIPTION OF THE RELATED ART

Robots are oftentimes employed for tasks that require high repetition, can be dangerous to humans, and/or require high-precision. For example, robots are frequently implemented in manufacturing applications and environments that are hazardous to humans. As a general matter, robots are machines that are automated or semi-automated, programmable, and capable of complex planar or three-dimensional movements. Many conventional robots are implemented with rigid components (e.g., actuators, manipulators, and end effectors), but, for improved dexterity, flexibility, and adaptability, continuum robots (also referred to as "soft robots") have been developed.

Continuum robots typically include one or more joints that can bend continuously along a finite length. The design and functionality of these continuously flexible joints are inspired by serpentine animal appendages, such as elephant trunks and octopus tentacles. The additional flexibility afforded by the continuously flexible joints makes continuum robots ideal for working in cluttered environments and enables continuum robots to be more adaptable in interacting with their surroundings relative to more traditional rigid robots. For example, in operation, a continuum robot can reach around nearby objects or otherwise modify its configuration to avoid collisions.

When operating a robot, an accurate kinematic model is usually required in order to determine the orientation and position of the different components of the robot, including the end effector. By parameterizing the motion and location of each component of a robot, a kinematic model enables trajectory planning, optimal path determination, and programming with respect to specific tasks that a robot is to perform. Because conventional parameterization schemes for robots assume rigid, non-flexible components, such schemes cannot be applied to continuum robots. As a result, current techniques for parameterizing robot motion of continuum robots suffer from multiple drawbacks.

First, the parameterization of the motions and positions associated with the different components of a continuum robot is more complex than that of conventional rigid robots, since each joint of a continuum robot typically has many more degrees of freedom than most or all of the joints of a rigid robot. Consequently, most of the current mathematical approaches for motion planning and inverse kinematics become very computationally expensive when applied to continuum robots with many degrees of freedom. Further, the additional time required to perform those types of computationally complex operations can introduce substantial lag in real-time robot control, which can negatively impact overall robot performance.

Second, conventional approaches for motion planning and inverse kinematics that rely on matrix inversion operations to generate solutions for continuum robot position and motion are subject to singularities. In the context of a continuum robot, a singularity is a certain combination of parametric values in a kinematic model that corresponds to a meaningful physical configuration of the continuum robot, but break-downs mathematically in inverse kinematics calculations. For example, when a flexible joint of a continuum robot is oriented as a straight line, the curvature of the flexible joint is defined as zero. Given a curvature of zero, a conventional inverse kinematic solution based on inversion of a matrix (e.g., a Jacobian matrix of a vector-valued function in multiple variables) fails to provide a mathematically-cognizable solution. Thus, such approaches are not suitable for use with continuum robots.

Third, known approaches for motion planning and inverse kinematics that avoid the above drawbacks are limited to continuum robot motion in two dimensions. However, limiting the operation of continuum robots to planar motion substantially reduces the overall usefulness of the continuum robot.

As the foregoing illustrates, what is needed in the art are more effective techniques for operating continuum robots.

SUMMARY

A computer-implemented method for controlling a robot, the method comprising: determining a first value for a first joint parameter associated with a first continuum joint included in the robot and a first value for a second joint parameter associated with the first continuum joint, wherein the first joint parameter indicates a bending radius of a flexible portion of the continuum joint, and the second joint parameter indicates a rotation of the flexible portion of the continuum joint with respect to a base portion of the first continuum joint; and positioning an end portion of the robot at a final target location based on the first value of the first joint parameter and the first value of the second joint parameter.

At least one technical advantage of the disclosed techniques relative to the prior art is that, with the disclosed techniques, motion planning and kinematic operations for a continuum robot can be performed more quickly and can be performed using fewer computational resources relative to what can be achieved using prior art approaches. Another advantage is that, as a general matter, the disclosed techniques are not subject to singularities because matrix inversion operations are not implemented to determine the values of the joint parameters associated with the continuum robot. A further advantage is that the disclosed techniques can be readily applied to motion of a continuum robot in three dimensions, since the each joint of the continuum robot is parameterized based on two degrees of freedom. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
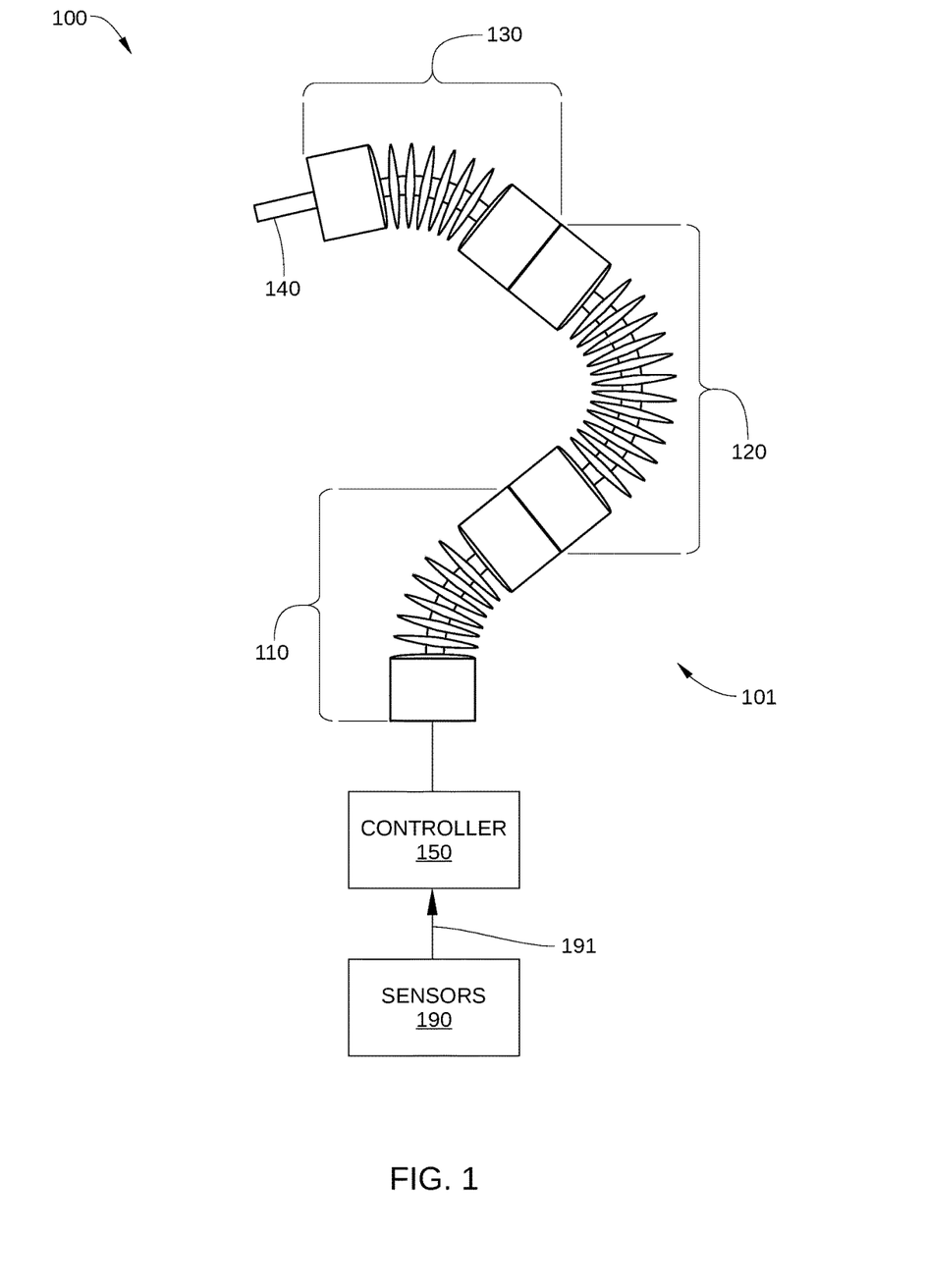
FIG. 1 is a conceptual illustration of a continuum robot configured to implement one or more aspects of the various embodiments.
Figure 2:
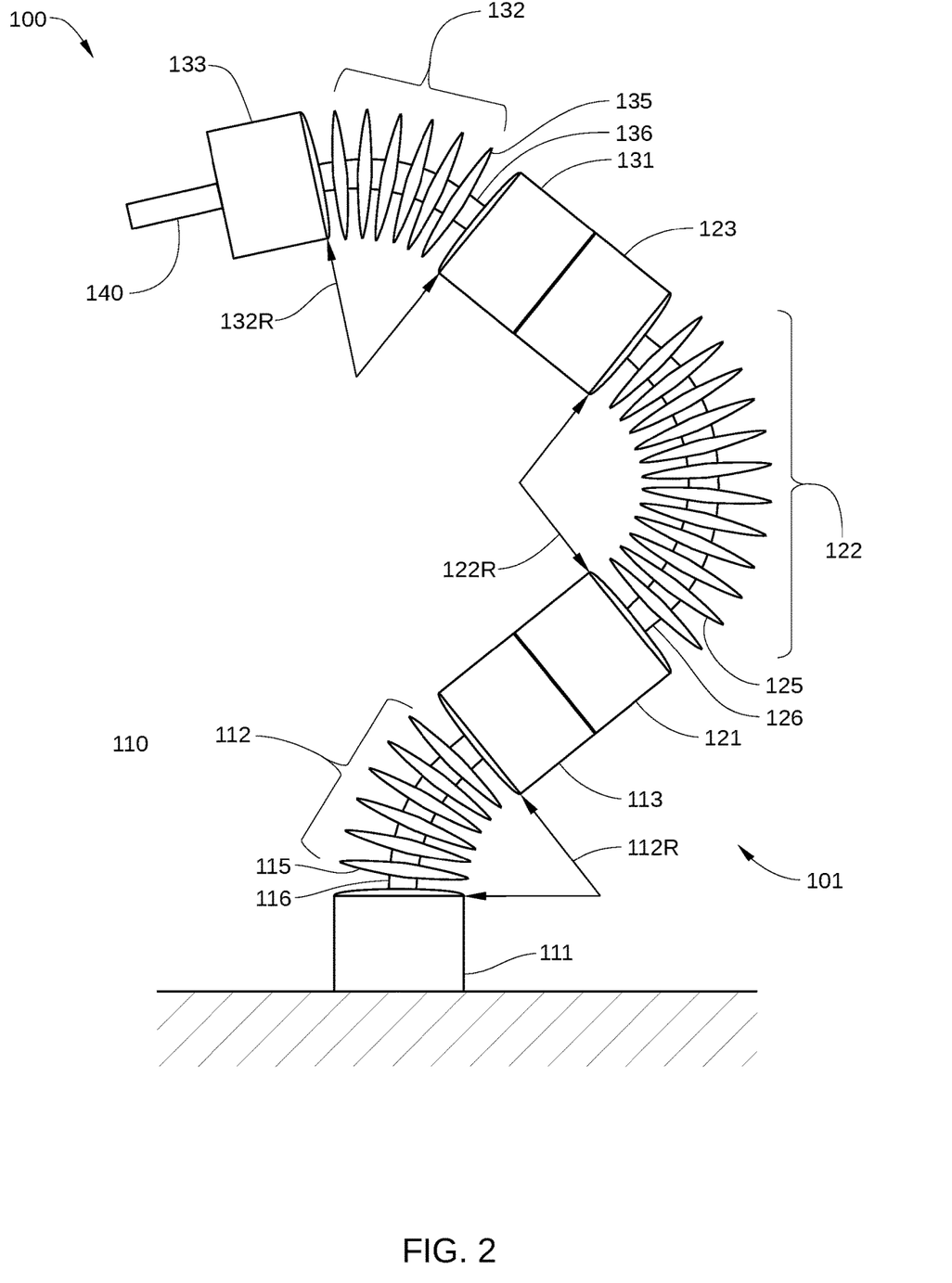
FIG. 2 is a more detailed illustration of the continuum robot of FIG. 1, according to various embodiments.

FIG. 1 is a conceptual illustration of a continuum robot 100 configured to implement one or more aspects of the embodiments, and FIG. 2 is a more detailed illustration of a robot arm 101 of continuum robot 100, according to various embodiments. As shown, continuum robot 100 includes robot arm 101 and a controller 150 configured to control operation of robot arm 101. In some embodiments, continuum robot 100 further includes one or more sensors 190 that provide sensor input 191 related to the environment surrounding continuum robot 100. Such sensor input may include any technically feasible sensor-generated information that can facilitate operation of continuum robot 100, such as optical sensor information, temperature information, motion-sensor information (for example gyroscope and/or accelerometer information), and/or the like.

Continuum robot 100 can be a machine or device configured to perform one or more repetitive, dangerous, and/or high-precision tasks. Such tasks may be related to manufacturing, hazardous environments, exploration, inspection, and/or the like, and may be performed in addition to or in lieu of tasks and/or actions performed by one or more humans. In some embodiments, continuum robot 100 is configured to operate with certain user input, such as pre-programmed motions and/or operations. Alternatively or additionally, in some embodiments, continuum robot 100 is configured to operate autonomously, for example in response to sensor input received from sensors 190.

Robot arm 101 includes one or more continuum joints, each of which is a "soft" or flexible joint that is configured to change shape during operation. Therefore, each continuum joint generally does not remain rigid and have the same shape at all times during operation. Instead, each continuum joint included in robot arm 101 is configured to deform to a particular target bending radius in a particular target direction to cause a targeted motion and orientation of a rigid top portion of the continuum joint to occur relative to a rigid base portion of the continuum joint.

In the embodiment illustrated in FIG. 1, robot arm 101 includes three continuum joints 110, 120, and 130, coupled in series as shown, and an end effector 140. Continuum joint 110 includes a base portion 111, a spine 112, and a top portion 113, continuum joint 120 includes a base portion 121, a spine 122, and a top portion 123, and continuum joint 130 includes a base portion 131, a spine 132, and a top portion 133. Further, in the embodiment illustrated in FIG. 1, continuum joints 110, 120, and 130, each include rigid portions and a selectively deformable portion. Specifically, base portion 111, base portion 121, base portion 131, top portion 113, top portion 123, and top portion 133 are straight and rigid portions, and spine 112, spine 122, and spine 132 are flexible and selectively deformable portions.

In some embodiments, spine 112 is configured to bend to a target bending radius 112R, and thereby modify the position and orientation of top portion 113 relative to base portion 111. In some embodiments, spine 112 is configured so that target bending radius 112R can vary from a minimum bending radius to a maximum bending radius of infinity, i.e., where spine 112 is configured as a straight segment. Generally, a value of minimum bending radius in a particular configuration of robot arm 101 is based on details of the mechanical design of spine 112, such as material properties of the various components of spine 112 and/or the morphology and physical dimensions of the various components of spine 112. Similarly, in some embodiments, spine 122 is configured to bend to a target bending radius 122R, and thereby modify the position and orientation of top portion 123 relative to base portion 121, and spine 132 is configured to bend to a target bending radius 132R, and thereby modify the position and orientation of top portion 133 relative to base portion 131. By selective bending of spine 112, spine 122, and/or spine 132, end effector 140 can be positioned at a target position in a three-dimensional space proximate continuum robot 100 and oriented with a target orientation in the three-dimensional space.

In the embodiment illustrated in FIGS. 1 and 2, target bending radius 112R, target bending radius 122R, and target bending radius 132R are each shown residing in the same plane. In practice, and as described in greater detail below, the selective bending of spine 112, spine 122, and/or spine 132 is not restricted to two-dimensions, and may occur in three-dimensional space.

In some embodiments, the selective bending of spine 112, spine 122, and/or spine 132, is enabled, for example, via pneumatic actuation of pneumatic cells arranged along a core element. Thus, in the embodiment illustrated in FIGS. 1 and 2, selective bending of spine 112 is enabled via pneumatic actuation of pneumatic cells 115 arranged along a core element 116 of spine 112, selective bending of spine 122 is enabled via pneumatic actuation of pneumatic cells 125 arranged along a core element 126 of spine 122, and selective bending of spine 132 is enabled via pneumatic actuation of pneumatic cells 135 arranged along a core element 136 of spine 132. In such embodiments, selective inflation and deflation of certain cells along the core element cause the core element to bend with a specific target bending radius. In other embodiments, any other technically feasible actuators included in spine 112, spine 122, and spine 132 can be employed to enable similar bending of spine 112, spine 122, and spine 132.

Controller 150 is configured to control operation of robot arm 101 and may be any technically feasible hardware unit capable of processing data and/or executing instructions associated with the operation of continuum robot 100. Thus, controller 150 can be implemented as any suitable processor or computing device, such as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU or digital signal processor (DSP). In some embodiments, controller 150 is implemented as a one or more integrated circuits or chips included in continuum robot 101. Alternatively, in some embodiments, controller 150 is implemented as a computing device, one embodiment of which is described below in conjunction with FIG. 5.

In some embodiments, controller 150 is configured to control operation of robot arm 101 via pre-programmed operations. In such embodiments, the pre-programmed operations cause end effector 140 (and in some embodiments other portions of robot arm 101) to move to a target position along a target trajectory. In some embodiments, the pre-programmed instructions may further cause end effector 140 to move end effector 140 (and in some embodiments other portions of robot arm 101) along the target trajectory (or trajectories) at one or more target velocities and/or one or more target accelerations. In such embodiments, the pre-programmed instructions include values for joint parameters for continuum joints 110, 120, and 130 to cause such motion to occur. In such embodiments, the values for the joint parameters are determined based on a kinematic model described herein according to various embodiments.

In some embodiments, controller 150 is configured to control operation of robot arm 101 autonomously. In such embodiments, controller 150 is configured to determine a target position of end effector 140 and/or a target trajectory of end effector 140 (and in some embodiments other portions of robot arm 101), then cause end effector 140 (and in some embodiments other portions of robot arm 101) to move to the target position along the target trajectory (or trajectories). In such embodiments, controller 150 may determine such target positions and/or target trajectories in real-time. In such embodiments, controller 150 determines suitable values for joint parameters for continuum joints 110, 120, and 130 so that the prescribed motion of robot arm 101 occurs. In such embodiments, the values for the joint parameters are determined based on a kinematic model described herein according to various embodiments.

Parameterization of Continuum Robots

According to various embodiments, a new parameterization model described herein accommodates the flexibility of continuous robot arms while remaining singularity-free in all instances. In the embodiments, two degrees of freedom are associated with each continuum joint in a continuum robot: bending radius of the continuum joint and rotation of a flexible portion (e.g., a spine portion) of the continuum joint with respect to a rigid base portion of the continuum joint. Further, for each continuum joint included in the continuum robot, the bending radius of the continuum joint is defined as one parameter for the continuum joint and the rotation of the flexible portion of the continuum joint is defined as another parameter. Using such a parameterization method, for each continuum joint, lower and upper bound limits on joint position, velocity, and acceleration can be set. In addition, in such a parameterization, the kinematics of a continuum robot can be defined using a relatively small number of parameters, which greatly facilitates the computationally efficient solution of forward kinematics, inverse kinematics, and trajectory planning problems. Further, the herein-described parameterization leads to simple kinematic expressions that enable inverse kinematic problems to be solved using Jacobian calculations of iterative methods (e.g., Newton-Raphson). An embodiment of a parameterization of continuum robot 100 in three-dimensional space is described below in conjunction with FIG. 3.

Figure 3:
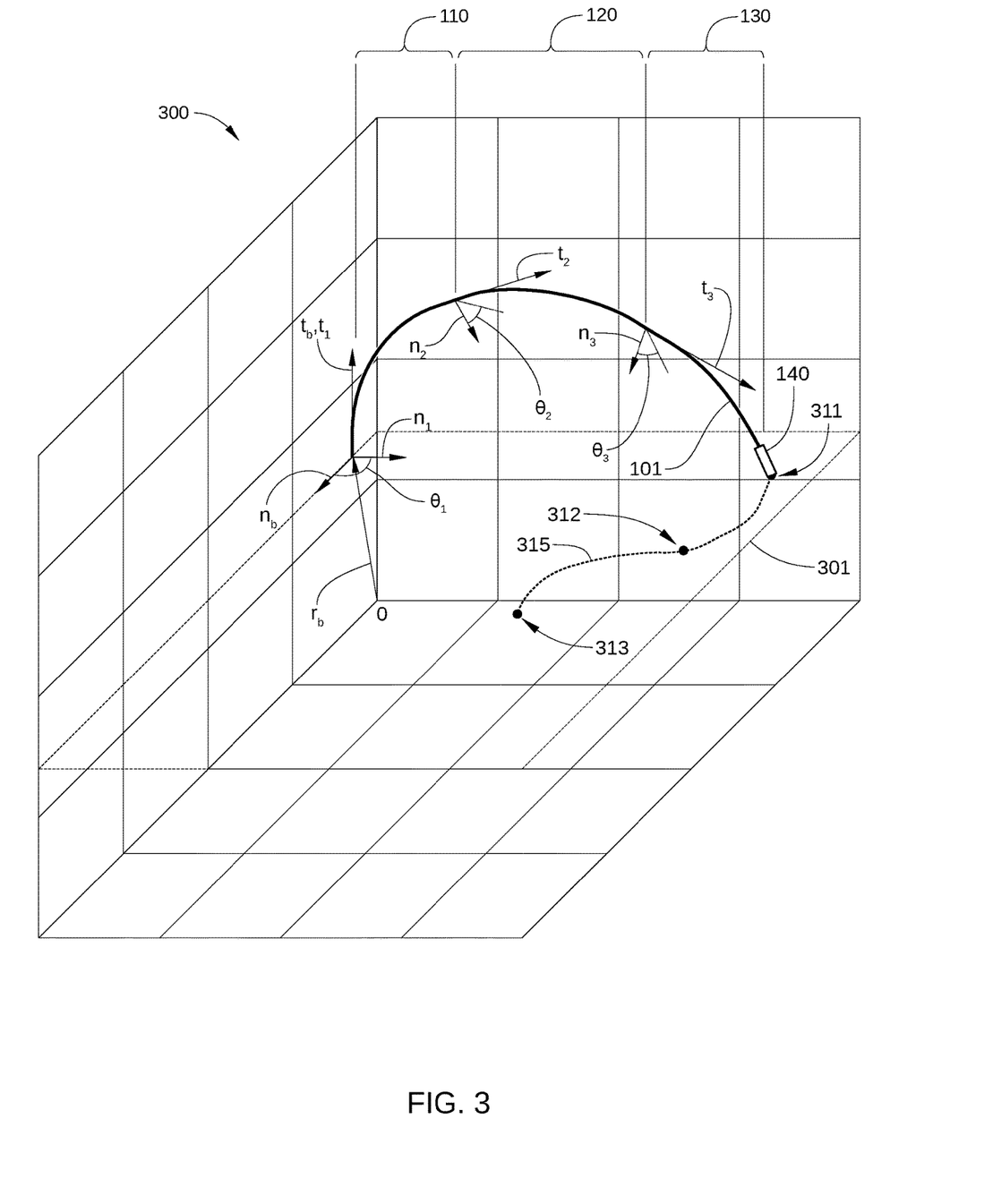
FIG. 3 schematically illustrates a robot arm of the continuum robot of FIG. 1 and associated joint parameters in a three-dimensional space, according to various embodiments.

FIG. 3 schematically illustrates robot arm 101 and associated joint parameters in a three-dimensional space 300, according to various embodiments. In some embodiments, to parameterize robot arm 101, certain parameters are defined for a base of robot arm 101 and for each joint of robot arm 101 (e.g., continuum joints 110, 120, and 130). In the embodiments, the following parameters are defined for the base of robot arm 101: $\vec{r}_b$=a position vector (e.g., relative to an origin 0) of the base of robot arm 101; $\vec{t}_b$=a tangent vector of the base of robot arm 101; and $\vec{n}_b$=a normal vector of the base of robot arm 101. In addition, in the embodiments, the following parameters are defined for each continuum joint of robot arm 101: $\vec{t}_i$=a tangent vector of the base of continuum joint i; $\vec{n}_i$=a normal vector of the base of continuum joint i; $R_i$=a joint radius (e.g., a radius of bending of joint i, omitted from FIG. 3 for clarity); and $\theta_i$=rotation of joint i with respect to $\vec{n}_i$, where i=1 references continuum joint 110, i=2 references continuum joint 120, and i=3 references continuum joint 130.

As shown, normal vector $\vec{n}_i$ is disposed in a base plane 301 of robot arm 101 and perpendicular to tangent vector $\vec{t}_b$ of robot arm 101. Similarly, for each of continuum joints 110, 120, and 130, normal vector $\vec{n}_i$ is disposed in a plane associated with a base portion of continuum joint i and is perpendicular to the tangent vector $\vec{t}_i$ of continuum joint i. It is noted that for continuum joint 110, normal vector $\vec{n}_1$ is in the same plane as normal vector $\vec{n}_b$, but for each other continuum joint of robot arm 101, normal vector $\vec{n}_i$ is not in the same plane as normal vector $\vec{n}_b$ and in most cases is not in a plane that is parallel to the plane including normal vector $\vec{n}_b$.

According to various embodiments, for each continuum joint of robot arm 101, the position and orientation of the top portion of the joint can be indicated (relative to the base portion of the joint) with two parameters: normal vector $\vec{n}_i$ and tangent vector $\vec{t}_i$. Thus, redundant degrees of freedom are not employed in the herein-described parameterization, which enables computational efficiency in solving forward kinematic and inverse kinematic problems. Further, the herein-described parameterization allows for a straightforward sequential addition of joint positions of robot arm 101 when simulating a robot arm with a large number of continuum joints.

Also shown in FIG. 3 are an initial location 311 of end effector 140, an intermediate target location 312 of end effector 140, and a final target location 313 of end effector 140. In operation, robot arm 101 moves end effector from initial location 311 to intermediate target location 312 and from intermediate target location 312 to final target location 313 along a target trajectory 315 in three-dimensional space. In some embodiments, continuum joint 110 and/or continuum joint 120 also follow a specific target trajectory (not shown for clarity) when end effector 140 moves from initial location 311 to final target location 313 along target trajectory 315.

Kinematic Model for Continuous Robots

A kinematic model of robot arm 101 is now described based on the above-described parameterization of robot arm 101. The kinematic model enables the solution of forward kinematics problems and inverse kinematics problems. In forward kinetics, the goal is to find the spatial position and orientation of different points on robot arm 101, particularly end effector 140, given a set of state variables (i.e., $R_i$ and $\theta_i$). In inverse kinematics, the goal is to find a set of values for state variables such that the position and orientation of a specific end effector is determined.

In some embodiments, a target position and orientation in space of an end effector (and/or other component) of robot arm 101 is determined via solution of a forward kinematics problem: that is, by calculating values for a set of state variables (denoted by $\vec{q}$) using a kinematic model based on the parameterization described above in conjunction with FIG. 3. Thus, $\vec{q}$ denotes a vector of state variables (i.e., joint radii $R_i$ and joint rotations $\theta_i$). In such embodiments, the forward kinematic model for robot arm 101 is denoted by $\vec{f}$, the target end effector position is denoted by $\vec{r}_t$, and $\vec{q}$ can be expressed via Equation 1:

$$\vec{f}(\vec{q}) = \vec{r}_t \qquad (1)$$

Utilizing the Rodrigues' rotation formula, tangent vector $\vec{t}_i$ and normal vector $\vec{n}_i$ for each continuum joint i (for $i \geq 2$) of robot arm 101 are described by Equations 2 and 3, in which $\phi_{i-1} = l_{s,i-1}/R_{i-1}$; and $l_{b,i}$, $l_{s,i}$, and $l_{t,i}$ represent base, spine, and top lengths of continuum joint i, respectively:

$$\vec{t}_i = \vec{t}_{i-1} \cos(\phi_{i-1}) + \vec{n}_{i-1} \sin(\phi_{i-1}) \qquad (2)$$

$$\vec{n}'_i = \vec{n}_{i-1} \cos(\phi_{i-1}) - \vec{t}_{i-1} \sin(\phi_{i-1}) \qquad (3)$$

Using Equations 2 and 3, $\vec{n}_i$ can be expressed by Equation 4:

$$\vec{n}_i = \vec{n}'_i \cos(\Theta_i) + \left(\vec{t}_i \times \vec{n}'_i\right)\sin(\Theta_i) = \\ \left(\vec{n}_{i-1}\cos(\phi_{i-1}) - \vec{t}_{i-1}\sin(\phi_{i-1})\right)\cos(\Theta_i) + \left(\vec{t}_{i-1} \times \vec{n}_{i-1}\right)\sin\Theta_i \qquad (4)$$

In some embodiments, a base vector $\vec{b}_i$ for each continuum joint is defined as: $\vec{b}_i = \vec{t}_i \times \vec{n}_i$. In such embodiments, the tangent vector $\vec{t}_i$, normal vector $\vec{b}_i$, and base vector $\vec{n}_i$ form a Cartesian coordinate frame at the base of each continuum joint of robot arm 101. Using Equations 2, 3, and 4, base vector $\vec{b}_i$ can be expressed by Equation 5:

$$\vec{b}_i = \vec{t}_i \times \vec{n}_i = (\vec{t}_{i-1} \sin(\phi_{i-1}) - \vec{n}_{i-1} \cos(\phi_{i-1}))\sin(\Theta_i) + \vec{b}_{i-1} \cos(\Theta_i) \qquad (5)$$

The position of a bottom node $\vec{r}_{b,i}$ of each continuum joint i (for i greater than or equal to 2) can be formulated by Equation 6, based on Equations 2, 3, and 4:

$$\vec{r}_{b,i} = \vec{r}_{b,i-1} + (l_{b,i-1} + R_{i-1}\sin(\phi_{i-1}) + l_{t,i-1}\cos(\phi_{i-1}))\vec{t}_{i-1} + (R_{i-1} - R_{i-1}\cos(\phi_{i-1}) + l_{t,i-1}\sin(\phi_{i-1}))\vec{n}_{i-1} \qquad (6)$$

where $\vec{r}_{b,1} = \vec{r}_b$.

Equations 2-6 provide a forward kinetic model of a multi-joint continuum robot. In addition, Equations 2-6 can be solved for the multiple joints recursively to find values for tangent vector $\vec{t}_i$, normal vector $\vec{n}_i$, base vector $\vec{b}_i$, and the position of the bottom node $\vec{r}_{b,i}$ for each continuum joint of the multi-joint continuum robot and an end effector included therein. It is noted that when $R_i$ tends to infinity (i.e., when continuum joint i becomes a straight line), $\phi_i = l_{s,i}/R_i$ tends towards zero. As a result, Equation 2 simplifies to Equation 7, Equation 3 simplifies to Equation 8, Equation 4 simplifies to Equation 9, and Equation 6 simplifies to Equation 10.

$$\vec{t}_i = \vec{t}_{i-1} \qquad (7)$$

$$\vec{n}_i = \vec{n}_{i-1} \cos(\phi_i) + \vec{b}_{i-1} \sin(\phi_i) \qquad (8)$$

$$\vec{b}_i = \vec{b}_{i-1} \cos(\phi_i) - \vec{n}_{i-1} \sin(\phi_i) \qquad (9)$$

$$\vec{r}_{b,i} = \vec{r}_{b,i-1} + \vec{t}_{i-1}(l_{b,i-1} + l_{s,i-1} + l_{t,i-1}) \qquad (10)$$

Because Equations 7-10 produce solutions that do not tend to infinity, the above-described kinetic model can be solved without singularities when continuum joint i becomes a straight line. Further, generating solutions for 4 is a computationally light process.

In some embodiments, values for a specific set of state variables that indicate a specified position and orientation of an end effector of a continuum robot arm are determined via inverse kinematics. Specifically, values for the set of state variables $\vec{q}$ are determined. In some embodiments, $\vec{q}$ is described by Equation 11:

$$\vec{q} = \vec{f}_{FK}^{-1}(\vec{r}_e) \qquad (11)$$

where $\vec{r}_e$ is the position of an end effector of the continuum robot arm and $\vec{f}_{FK}$ represents the system of forward kinematic equations that form the kinetic model for the continuum robot arm, for example, Equations 2-6. For a continuum robot that includes m joints, since each joint has two degrees of freedom associated therewith, the continuum robot has 2 m degrees of freedom in total. Thus, a continuum robot with two or more continuum joints is a redundant manipulator, and Equation 11 has an infinite number of solutions. However, there are various techniques known in the art for determining values for the set of state variables $\vec{q}$ in Equation 11, such as the pseudo-inverse, Jacobian transpose, or damped least-square methods.

Motion Planning for Parameterized Continuum Robots

In some embodiments, motion planning of a continuum robot is implemented using the kinematic model described above by Equations 1-11. In such embodiments, such motion planning enables motions, tasks, and other operations to be performed by a continuum robot. In such embodiments, values determined for the set of state variables q are employed in the continuum robot to cause motion of an end effector (and in some embodiments, one or more other portions of the continuum robot) to target locations and/or orientations. In some embodiments, values determined for the set of state variables $\vec{q}$ in the continuum robot are employed to cause motion of the end effector (and in some embodiments, one or more other portions of the continuum robot) to the target locations and/or orientations along a target trajectory. One such embodiment is described below in conjunction with FIG. 4.

Figure 4:
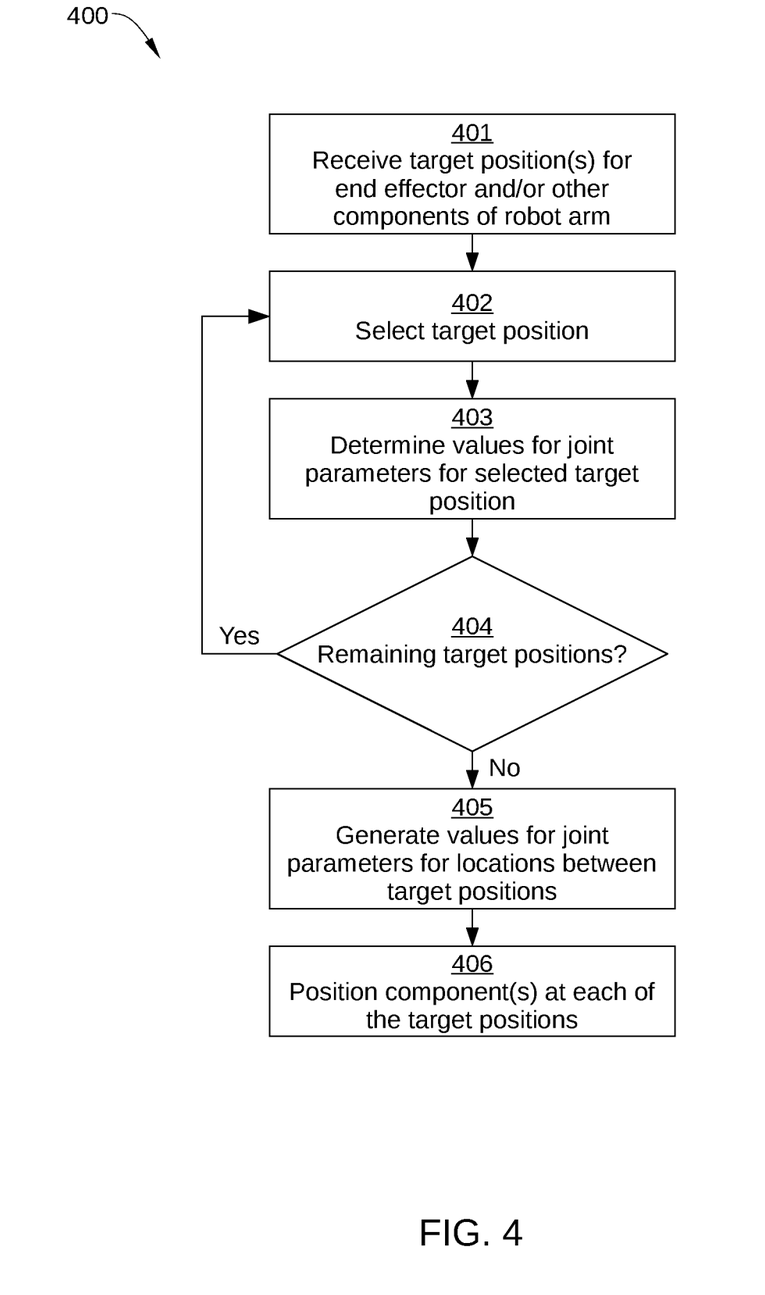
FIG. 4 sets forth a flowchart of method steps for controlling a continuum robot, according to various embodiments.

FIG. 4 sets forth a flowchart of method steps for controlling a continuum robot, according to various embodiments. Although the method steps are described in conjunction with the systems of FIGS. 1-3, persons skilled in the art will understand that any system configured to perform the method steps, in any order, is within the scope of the embodiments.

As shown, a computer-implemented method 400 begins at step 401, where controller 150 receives one or more target positions. As used herein, a target position is defined as a specific location and a specific orientation of a particular component of robot arm 101, such as end effector 140, a base portion of a particular continuum joint, a top portion of a particular continuum joint, and/or the like. For example, in some embodiments, controller 150 receives a final target position for end effector 140, as well as one or more intermediate target positions for end effector 140. The final target position and one or more intermediate target positions are subsequently employed to generate values for the joint parameters of robot arm 101 that cause end effector 140 to follow a trajectory that ends at the final target position. The values are generated based on the parameterization described above in conjunction with FIG. 3. Additionally or alternatively, in some embodiments, controller 150 may receive a final target position and/or intermediate target position(s) for one or more other components of robot arm 101. In such embodiments, the final target position and one or more intermediate target positions are subsequently employed to generate values for the joint parameters of robot arm 101 that cause the one or more components of robot arm 101 to follow a trajectory that ends at the final target position.

In some embodiments, in step 401, controller 150 also receives additional trajectory planning information, such as one or more time constraints (e.g., a maximum time to complete the motion associated with the one or more target positions), one or more velocity constraints associated with a particular component of robot arm 101 (e.g., a minimum velocity of the component for a portion of a planned trajectory), one or more acceleration constraints associated with a particular component of robot arm 101 (e.g., a maximum acceleration of the component), one or more positional constraints (e.g., a "keep out" region for avoiding collisions and/or a hazardous area to be avoided as much as possible), and/or the like.

In step 402, controller 150 selects one of the target positions received in step 401.

In step 403, controller 150 determines values for the joint parameters of robot arm 101 that, when implemented by the continuum joints of robot arm 101, cause end effector 140 (or some other component of robot arm 101) to be in the target position. Thus, in step 403, controller 150 determines values of the set of state variables $\vec{q}$ in Equation 11. Any technique known in the art can be employed by controller 150 to determine the values in step 403 via Equations 1-10, including performing a pseudo-inverse method, a Jacobian transpose method, or a damped least-square methods, among others. Because Equations 1-10 are trigonometric equations and easily solved, the process of step 403 is computationally inexpensive, and can be performed quickly. Thus, in some embodiments, computer-implemented method 400 can be employed for real-time control of robot arm 101. Furthermore, the coefficients in Equations 1-10 are always invertible and therefore always have a solution. Thus, singularities are also avoided.

As noted previously, a continuum robot with two or more continuum joints is a redundant manipulator. As such, one or more additional criteria can be included as constraints when determining the values of the set of state variables $\vec{q}$ in Equation 11. For example, such additional criteria can include one or more performance metrics of robot arm 101, such as a collision avoidance factor for a path followed by at least a portion of robot arm 101 when end effector 140 (or some other component of robot arm 101) is in the target position; an actuator torque factor associated with one or more actuators of the robot arm, an energy expenditure factor, and a time expenditure factor.

In some embodiments, the actuator torque factor is a measure of torque when end effector 140 (or some other component of robot arm 101) is in the target position. In such embodiments, the actuator torque factor may be a summation of torques at the base of each continuum joint of robot arm 101, a torque at the base of a particular continuum joint of robot arm 101, or a torque at the base of robot arm 101. In some embodiments, the energy expenditure factor is a measure of energy required to position end effector 140 (or some other component of robot arm 101) in the target position, for example from an adjacent target position. In some embodiments, the time expenditure factor is a measure of time required to position end effector 140 (or some other component of robot arm 101) in the target position, for example from an adjacent target position.

In embodiments in which one or more performance metrics of robot arm 101 are considered when determining the values of the set of state variables $\vec{q}$ in Equation 11, any conventional optimization method can be employed with respect to the one or more performance metrics. Thus, in such embodiments, values of the set of state variables q are determined where the one or more performance metrics are minimized (or in some cases maximized). For example, in an embodiment in which the performance metric being considered is the sum of torque applied to each continuum joint of robot arm 101, values of the set of state variables q can be determined using a gradient-based constrained optimization method or operation. In such an embodiment, the objective function is the total torque required to hold a given payload at end effector 140 when end effector 140 is in the target position.

In step 404, controller 150 determines whether there are any remaining target positions for which values of the set of state variables $\vec{q}$ have not been determined. If yes, computer-implemented method 400 proceeds to step 405; if no, computer-implemented method 400 returns to step 402.

In step 405, controller 150 generates values of the set of state variables $\vec{q}$ for locations between the target positions. In some embodiments, controller 150 applies interpolation between the values associated with adjacent target positions to generate the value in step 405. In some embodiments, to achieve a smoother path from one target position to another target position, controller 150 employs a third-order polynomial method and/or a third-order spline approach to complete the interpolation between two adjacent target positions. In some embodiments, controller 150 also employs velocity information and/or acceleration information associated with end effector 140 and/or other components of robot arm 101 to achieve a smoother path from one target position to another target position.

In step 406, controller 150 causes robot arm 101 to position end effector 140 (and/or some other component(s) of robot arm 101) at each of the target positions received in step 401. Thus, in step 406, controller 150 causes robot arm 101 to position end effector 140 (or other component(s) of robot arm 101) at the final target position for that component, via the one or more intermediate target positions received in step 401 for that component. As a result, end effector 140 (and/or other component(s) of robot arm 101) follows a specified trajectory that includes the one or more intermediate target positions and the final target position. To cause the above, for each position along the specified trajectory, controller 150 causes one or more of the continuum joints of robot arm 101 to deform with an appropriate bending radius and rotate with respect to the rigid base portion of the continuum joint by a suitable rotation. For a given position, the appropriate bending radius corresponds to a determined value of the bending radius joint parameter at that position, and the appropriate rotation corresponds to a determined value of the rotation joint parameter at that position.

Exemplary Computing Device

Figure 5:
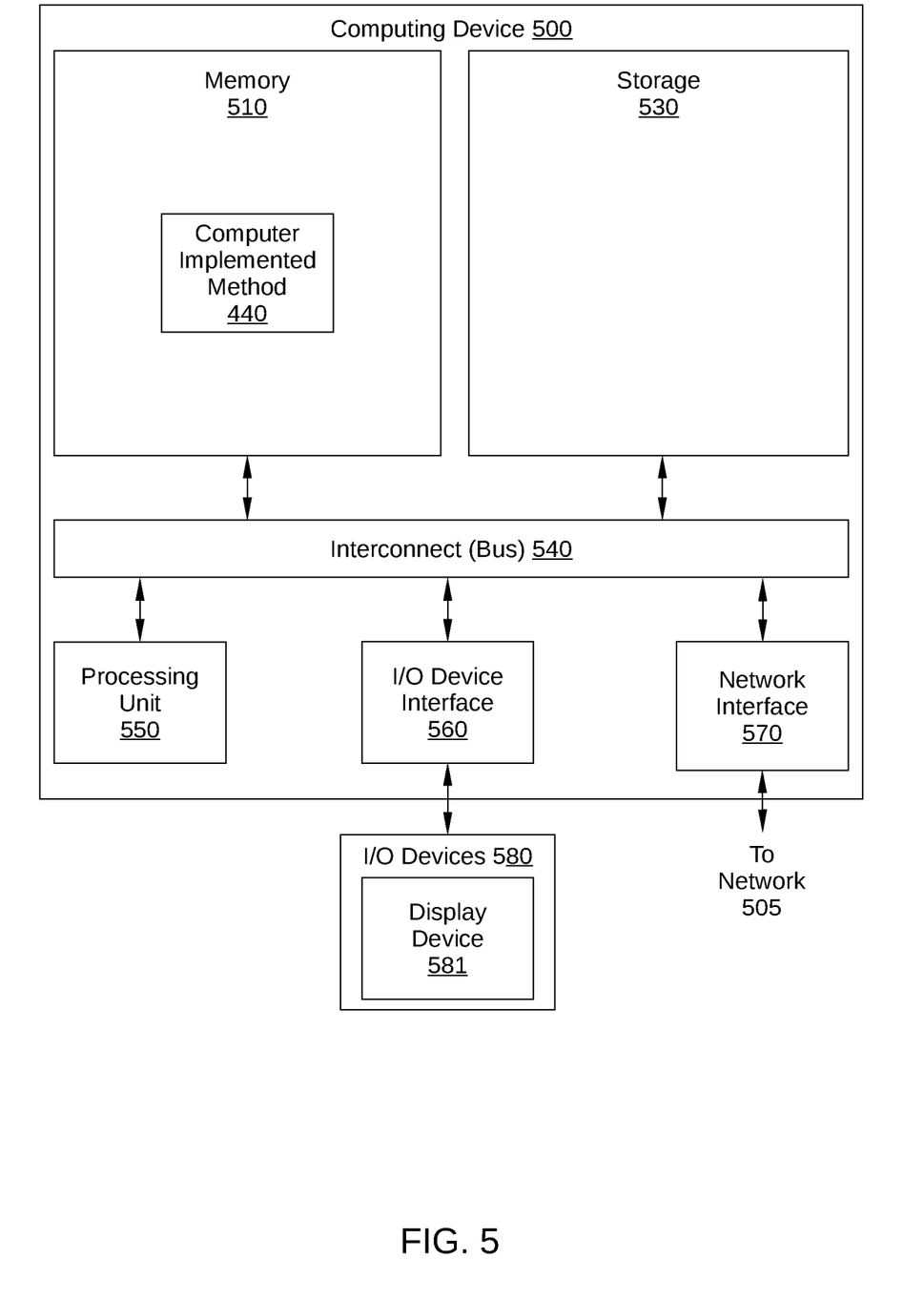
FIG. 5 is a block diagram of a computing device configured to implement one or more aspects of the present disclosure.

FIG. 5 is a block diagram of a computing device 500 configured to implement one or more aspects of the various embodiments. Thus, computing device 500 can be a computing device associated with implementing controller 150 and/or any other computing device associated with continuum robot 100. Computing device 500 may be a desktop computer, a laptop computer, a tablet computer, or any other type of computing device configured to receive input, process data, generate control signals, and display images. Computing device 500 is configured to run computer-implemented method 400 and/or other suitable software applications, which can reside in a memory 510. It is noted that the computing device described herein is illustrative and that any other technically feasible configurations fall within the scope of the present disclosure.

As shown, computing device 500 includes, without limitation, an interconnect (bus) 540 that connects a processing unit 550, an input/output (I/O) device interface 560 coupled to input/output (I/O) devices 580, memory 510, a storage 530, and a network interface 570. Processing unit 550 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 550 may be any technically feasible hardware unit capable of processing data and/or executing software applications, including computer-implemented method 400. Further, in the context of this disclosure, the computing elements shown in computing device 500 may correspond to a physical computing system (e.g., a system in a data center) or may be a virtual computing instance executing within a computing cloud.

I/O devices 580 may include devices capable of providing input, such as a keyboard, a mouse, a touch-sensitive screen, and so forth, as well as devices capable of providing output, such as a display device 581. Additionally, I/O devices 580 may include devices capable of both receiving input and providing output, such as a touchscreen, a universal serial bus (USB) port, and so forth. I/O devices 580 may be configured to receive various types of input from an end-user of computing device 500, and to also provide various types of output to the end-user of computing device 500, such as one or more graphical user interfaces (GUI), displayed digital images, and/or digital videos. In some embodiments, one or more of I/O devices 580 are configured to couple computing device 500 to a network 505.

Memory 510 may include a random access memory (RAM) module, a flash memory unit, or any other type of memory unit or combination thereof. Processing unit 550, I/O device interface 560, and network interface 570 are configured to read data from and write data to memory 510. Memory 510 includes various software programs that can be executed by processor 550 and application data associated with said software programs, including computer-implemented method 400.

In sum, the various embodiments described herein provide techniques for the parameterization and kinematic modeling of continuum robots. In the embodiments, the continuum joints of a continuum robot can be fully configured in three-dimensional space by parameterizing each joint with two joint parameters: a bending radius of the joint and a rotation of the joint with respect to a normal vector of a base of the joint. Thus, two degrees of freedom are associated with each continuum joint, and redundant degrees of freedom are not employed to parameterize the continuum robot. Based on the above joint parameters, the kinematic equations describing motion of the joints of a continuum robot are trigonometric equations and not differential equations, and therefore can be inverted when a value for a joint parameter approaches infinity.

At least one technical advantage of the disclosed techniques relative to the prior art is that the disclosed techniques enable motion planning and kinematic operations for a continuum robot to be performed more quickly and with fewer computational resources than prior art techniques. Another advantage is that the disclosed techniques are not subject to singularities, since matrix inversion is not employed to determine values for joint parameters. A further advantage is that the disclosed techniques can be readily applied to motion of a continuum robot in three dimensions, since the each joint of the continuum robot is parameterized with two degrees of freedom. These technical advantages provide one or more technological advancements over prior art approaches.

1. In some embodiments, a computer-implemented method for controlling a robot, the method comprising: determining a first value for a first joint parameter associated with a first continuum joint included in the robot and a first value for a second joint parameter associated with the first continuum joint, wherein the first joint parameter indicates a bending radius of a flexible portion of the continuum joint, and the second joint parameter indicates a rotation of the flexible portion of the continuum joint with respect to a base portion of the first continuum joint; and positioning an end portion of the robot at a final target location based on the first value of the first joint parameter and the first value of the second joint parameter.

2. The computer-implemented method of clause 1, wherein the second joint parameter indicates the rotation of the flexible portion of the continuum joint with respect to a base normal vector of the base portion.

3. The computer-implemented method of clauses 1 or 2, wherein, in combination, the first joint parameter and the second joint parameter indicate a unique location in a three-dimensional space of the end portion.

4. The computer-implemented method of any of clauses 1-3, wherein determining the first value for the first joint parameter and the first value for the second joint parameter comprises performing a constrained optimization operation in which an objective function is associated with at least one performance metric of the robot arm.

5. The computer-implemented method of any of clauses 1-4, wherein the at least one performance metric of the robot arm is associated with positioning the end portion at the final target location and includes one or more of a collision avoidance factor for a path followed by at least a portion of the robot during the positioning; an actuator torque factor associated with one or more actuators of the robot arm; an energy expenditure factor; and a time expenditure factor.

6. The computer-implemented method of any of clauses 1-5, wherein determining the first value for the first joint parameter and the first value for the second joint parameter is based on a second value for the first joint parameter and a second value for the second joint parameter.

7. The computer-implemented method of any of clauses 1-6, wherein the second value for the first joint parameter and the second value for the second joint parameter indicate an initial location and an initial orientation of the end portion of the continuum joint.

8. The computer-implemented method of any of clauses 1-7, wherein the second value for the first joint parameter and the second value for the second joint parameter indicate an intermediate location and an intermediate orientation of the end portion of the continuum joint.

9. The computer-implemented method of any of clauses 1-8, wherein the intermediate target location is disposed between the initial location and the final target location of the end portion.

10. The computer-implemented method of any of clauses 1-9, further comprising generating additional values for the first joint parameter and the second joint parameter by: interpolating between the first value for the first joint parameter and a second value for the first joint parameter to generate one or more additional values for the first joint parameter; and interpolating between the first value for the second joint parameter and a second value for the second joint parameter to generate one or more additional values for the second joint parameter.

11. In some embodiments, a non-transitory computer readable medium storing instructions that, when executed by a processor, cause the processor to perform the steps of: determining a first value for a first joint parameter associated with a first continuum joint included in the robot and a first value for a second joint parameter associated with the first continuum joint, wherein the first joint parameter indicates a bending radius of a flexible portion of the continuum joint, and the second joint parameter indicates a rotation of the flexible portion of the continuum joint with respect to a base portion of the first continuum joint; and positioning an end portion of the robot at a final target location based on the first value of the first joint parameter and the first value of the second joint parameter.

12. The computer-implemented method of clause 11, wherein the second joint parameter indicates the rotation of the flexible portion of the continuum joint with respect to a base normal vector of the base portion.

13. The computer-implemented method of clauses 11 or 12, wherein, in combination, the first joint parameter and the second joint parameter indicate a unique location in a three-dimensional space of the end portion.

14. The computer-implemented method of any of clauses 11-13, wherein determining the first value for the first joint parameter and the first value for the second joint parameter comprises inverting a forward kinetics model of the robot arm to generate a vector of state variable values associated with a plurality of continuum joints included in the robot, wherein a plurality of state variables corresponding to the plurality of state variable values includes, for each continuum joint included in the plurality of continuum joints, a third joint parameter that indicates a bending radius of a flexible portion of the continuum joint and a fourth joint parameter that indicates a rotation of the flexible portion of the continuum joint with respect to a base portion of the continuum joint.

15. The computer-implemented method of any of clauses 11-14, wherein the forward kinetics model of the robot arm is based on a set of trigonometric equations that include the state variables.

16. The computer-implemented method of any of clauses 11-15, wherein the forward kinetics model of the robot arm includes trigonometric equations that can be recursively solved for each of the multiple continuum joints.

17. The computer-implemented method of any of clauses 11-16, wherein, in the forward kinetics model, each continuum joint included in the plurality of continuum joints has no more than a first degree of freedom associated with the third joint parameter and a second degree of freedom associated with the fourth joint parameter.

18. The computer-implemented method of any of clauses 11-17, wherein determining the first value for the first joint parameter and the first value for the second joint parameter is based on the final target location of the end portion and the final target orientation of the end portion.

19. The computer-implemented method of any of clauses 11-18, wherein positioning the end portion of the robot at the final target location comprises causing the flexible portion to: deform with a bending radius that corresponds to the first value of the first joint parameter; and rotate with respect to the base portion by a rotation that corresponds to the first value of the second joint parameter.

20. In some embodiments, a system, comprising: a robot that includes a continuum joint; a memory that stores instructions; and a controller that is communicatively coupled to the memory and is configured to, when executing the instructions: determine a first value for a first joint parameter associated with a first continuum joint included in the robot and a first value for a second joint parameter associated with the first continuum joint, wherein the first joint parameter indicates a bending radius of a flexible portion of the continuum joint, and the second joint parameter indicates a rotation of the flexible portion of the continuum joint with respect to a base portion of the first continuum joint; and cause an end portion of the robot to be positioned at a final target location based on the first value of the first joint parameter and the first value of the second joint parameter.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling a robot, the method comprising:
   determining a first value for a first joint parameter associated with a first continuum joint included in the robot and a first value for a second joint parameter associated with the first continuum joint based on a final target location of an end portion of the robot, wherein the first joint parameter indicates a bending radius of a flexible portion of the first continuum joint, and the second joint parameter indicates a rotation of the flexible portion of the first continuum joint with respect to a base portion of the first continuum joint, wherein determining the first value for the first joint parameter and the first value for the second joint parameter is further based on a second value for the first joint parameter and a second value for the second joint parameter that indicate an intermediate location and an intermediate orientation of the end portion; and
   positioning the end portion of the robot at the final target location based on the first value of the first joint parameter and the first value of the second joint parameter.

2. The computer-implemented method of claim 1, wherein the second joint parameter indicates the rotation of the flexible portion of the first continuum joint with respect to a base normal vector of the base portion.

3. The computer-implemented method of claim 1, wherein, in combination, the first joint parameter and the second joint parameter indicate a unique location in a three-dimensional space of the end portion.

4. The computer-implemented method of claim 1, wherein determining the first value for the first joint parameter and the first value for the second joint parameter comprises performing a constrained optimization operation in which an objective function is associated with at least one performance metric of the robot.

5. The computer-implemented method of claim 4, wherein the at least one performance metric of the robot is associated with positioning the end portion at the final target location and includes at least one of a collision avoidance factor for a path followed by at least a portion of the robot during the positioning; an actuator torque factor associated with one or more actuators of the robot arm; an energy expenditure factor; or a time expenditure factor.

6. The computer-implemented method of claim 1, wherein the intermediate location is disposed between an initial location and the final target location of the end portion.

7. The computer-implemented method of claim 1, further comprising generating additional values for the first joint parameter and the second joint parameter by:
    interpolating between the first value for the first joint parameter and the second value for the first joint parameter to generate one or more additional values for the first joint parameter; and
    interpolating between the first value for the second joint parameter and the second value for the second joint parameter to generate one or more additional values for the second joint parameter.

8. One or more non-transitory computer-readable media storing instructions that, when executed by a one or more processors, cause the one or more processors to perform the steps of:
    determining a first value for a first joint parameter associated with a first continuum joint included in the robot and a first value for a second joint parameter associated with the first continuum joint based on a final target location of an end portion of the robot, wherein the first joint parameter indicates a bending radius of a flexible portion of the first continuum joint, and the second joint parameter indicates a rotation of the flexible portion of the first continuum joint with respect to a base portion of the first continuum joint, wherein determining the first value for the first joint parameter and the first value for the second joint parameter is further based on a second value for the first joint parameter and a second value for the second joint parameter that indicate an intermediate location and an intermediate orientation of the end portion; and
    positioning the end portion of the robot at the final target location based on the first value of the first joint parameter and the first value of the second joint parameter.

9. The one or more non-transitory computer-readable media of claim 8, wherein the second joint parameter indicates the rotation of the flexible portion of the first continuum joint with respect to a base normal vector of the base portion.

10. The one or more non-transitory computer-readable media of claim 8, wherein, in combination, the first joint parameter and the second joint parameter indicate a unique location in a three-dimensional space of the end portion.

11. The one or more non-transitory computer-readable media of claim 8, wherein determining the first value for the first joint parameter and the first value for the second joint parameter comprises inverting a forward kinetics model of a robot arm included in the robot to generate a vector of state variable values associated with a plurality of continuum joints included in the robot, wherein a plurality of state variables corresponding to the plurality of state variable values includes, for each continuum joint included in the plurality of continuum joints, a third joint parameter that indicates a bending radius of a flexible portion of the continuum joint and a fourth joint parameter that indicates a rotation of the flexible portion of the continuum joint with respect to a base portion of the continuum joint.

12. The one or more non-transitory computer-readable media of claim 11, wherein the forward kinetics model of the robot arm is based on a set of trigonometric equations that include the plurality of state variables.

13. The one or more non-transitory computer-readable media of claim 11, wherein the forward kinetics model of the robot arm includes trigonometric equations that can be recursively solved for each of the plurality of continuum joints.

14. The one or more non-transitory computer-readable media of claim 11, wherein, in the forward kinetics model, each continuum joint included in the plurality of continuum joints has no more than a first degree of freedom associated with the first joint parameter and a second degree of freedom associated with the second joint parameter.

15. The one or more non-transitory computer-readable media of claim 8, wherein positioning the end portion of the robot at the final target location comprises causing the flexible portion to:
    deform with a bending radius that corresponds to the first value of the first joint parameter; and
    rotate with respect to the base portion by a rotation that corresponds to the first value of the second joint parameter.

16. A system, comprising:
    a robot that includes a continuum joint;
    a memory that stores instructions; and
    a controller that is communicatively coupled to the memory and is configured to, when executing the instructions:
    determine a first value for a first joint parameter associated with a first continuum joint included in the robot and a first value for a second joint parameter associated with the first continuum joint based on a final target location of an end portion of the robot, wherein the first joint parameter indicates a bending radius of a flexible portion of the first continuum joint, and the second joint parameter indicates a rotation of the flexible portion of the first continuum joint with respect to a base portion of the first continuum joint, wherein determining the first value for the first joint parameter and the first value for the second joint parameter is further based on a second value for the first joint parameter and a second value for the second joint parameter that indicate an intermediate location and an intermediate orientation of the end portion; and
    cause the end portion of the robot to be positioned at the final target location based on the first value of the first joint parameter and the first value of the second joint parameter.

17. The computer-implemented method of claim 1, wherein:
    determining the first value for the first joint parameter and the first value for the second joint parameter is further based on a final target orientation of the end portion; and
    positioning the end portion of the robot comprises positioning the end portion of the robot at the final target location with the final target orientation based on the first value of the first joint parameter and the first value of the second joint parameter.

18. A computer-implemented method for controlling a robot, the method comprising:
    determining a first value for a first joint parameter associated with a first continuum joint included in the robot and a first value for a second joint parameter associated with the first continuum joint based on a final target location of an end portion of the robot, wherein the first joint parameter indicates a bending radius of a flexible portion of the first continuum joint, and the second joint parameter indicates a rotation of the flexible portion of the first continuum joint with respect to a base portion of the first continuum joint, wherein determining the first value for the first joint parameter and the first value for the second joint parameter comprises inverting a forward kinetics model of a robot arm included in the robot to generate a vector of state variable values associated with a plurality of continuum joints included in the robot, and wherein the forward kinetics model includes trigonometric equations that can be recursively solved for each of the plurality of continuum joints; and positioning the end portion of the robot at the final target location based on the first value of the first joint parameter and the first value of the second joint parameter.

19. A computer-implemented method for controlling a robot, the method comprising:

determining a first value for a first joint parameter associated with a first continuum joint included in the robot and a first value for a second joint parameter associated with the first continuum joint based on a final target location of an end portion of the robot, wherein the first joint parameter indicates a bending radius of a flexible portion of the first continuum joint, and the second joint parameter indicates a rotation of the flexible portion of the first continuum joint with respect to a base portion of the first continuum joint, wherein determining the first value for the first joint parameter and the first value for the second joint parameter comprises inverting a forward kinetics model of a robot arm included in the robot to generate a vector of state variable values associated with a plurality of continuum joints included in the robot, and wherein, in the forward kinetics model, each continuum joint included in the plurality of continuum joints has no more than a first degree of freedom associated with a bending radius and a second degree of freedom associated with a rotation; and positioning the end portion of the robot at the final target location based on the first value of the first joint parameter and the first value of the second joint parameter.

* * * * *

UNITED STATES PATENT AND TRADEMARK OFFICE
CERTIFICATE OF CORRECTION

PATENT NO. : 12,220,818 B2
APPLICATION NO. : 17/319502
DATED : February 11, 2025
INVENTOR(S) : Mehran Ebrahimi, Hyunmin Cheong and Adrian Butscher It is certified that error appears in the above-identified patent and that said Letters Patent is hereby corrected as shown below:

On the Title Page (56) References Cited:

Please delete "Iannan et al., 'Kinematics and the Implementation of an Elephant's Trunk Manipulator and Other Continuum Style Robots Journal of Robotic Systems", DOI: 10.002/rob. 10070, vol. 20, No. 2, 2003, pp. 45-63." and insert --Hannan et al., 'Kinematics and the Implementation of an Elephant's Trunk Manipulator and Other Continuum Style Robots Journal of Robotic Systems", DOI: 10.002/rob. 10070, vol. 20, No. 2, 2003, pp. 45-63.--;

Please delete "Arranaga et al., "Optimization in continuous domains by learning and simulation of gaussian networks", Genetic and Evolutionary Computation Conference (GECCO), 2000, 4 pages." and insert --Larranaga et al., "Optimization in continuous domains by learning and simulation of gaussian networks", Genetic and Evolutionary Computation Conference (GECCO), 2000, 4 pages.--;

In the Claims

Column 17, Claim 8, Line 20, please delete "a".

Signed and Sealed this
Eighth Day of April, 2025

Coke Morgan Stewart
*Acting Director of the United States Patent and Trademark Office*